United States Patent [19]
Wood et al.

[11] 3,945,196
[45] Mar. 23, 1976

[54] UNIVERSAL SOLID STATE TIME-KEEPING PACKAGE

[75] Inventors: John R. Wood; James B. Morris, Sr., both of San Jose; Arnold M. Massoletti, Santa Clara, all of Calif.

[73] Assignee: American Microsystems, Inc., Santa Clara, Calif.

[22] Filed: May 30, 1974

[21] Appl. No.: 474,397

[52] U.S. Cl. ..................... 58/50 R; 58/23 R; 58/55; 339/17 R

[51] Int. Cl.$^2$ G04B 19/30; G04C 3/00; G04B 37/00; H02K 1/07

[58] Field of Search .............. 58/23 R, 50 R, 53, 55; 174/68.5; 339/17 R, 17 LM, 17 LN; 340/336

[56] References Cited

UNITED STATES PATENTS

| | | | |
|---|---|---|---|
| 3,680,037 | 7/1972 | Nellis et al. | 339/17 R |
| 3,750,383 | 8/1973 | Kakizawa | 58/23 BA |
| 3,757,510 | 7/1972 | Dill | 58/23 R |
| 3,759,031 | 9/1973 | McCullough et al. | 58/23 R |
| 3,861,135 | 2/1973 | Seeger Jr. et al. | 58/50 R |

*Primary Examiner*—Edith Simmons Jackmon
*Attorney, Agent, or Firm*—Owen, Wickersham & Erickson

[57] ABSTRACT

An assembly of electronic components and a method of packaging such components to form a solid state time-keeping device capable of being housed in watch cases having different external configurations. The assembly includes a sub-assembly component which combines and interconnects an integrated semiconductor device with other discrete elements required to perform basic timing function in a compact package. This sub-assembly and the various other electronic components are readily removable and interchangeably replaceable with simple jeweler's hand tools.

17 Claims, 13 Drawing Figures

UNIVERSAL SOLID STATE TIME-KEEPING PACKAGE

This invention relates to electronic time-keeping assemblies and more particularly to a method for packaging components of a solid state electronic time-keeping wrist watch to form such assemblies that are adaptable for use within a variety of watch cases or frames of different sizes and shapes.

Electronic watch assemblies have been previously devised utilizing well established electronic digital principles and circuitry for time-keeping. Such assemblies have utilized a continuous time display such as a liquid crystal electro-optics device driven by a time base signal produced by frequency divider circuits from a time base signal produced by a stable quartz crystal controlled oscillator. Power for the time-keeping circuitry was supplied by a small battery cell, and a higher voltage required for the display was produced by a small toroidally wound step-up transformer. A constant time display with very low power consumption and very small physical size and weight was achieved by using a single large scale integrated (LSI) complementary metal oxide silicon (CMOS) semi-conductor micro-circuit mounted within and connected directly to a small printed circuit substrate containing all electronic components required for time-keeping except a quartz crystal, power cell, step-up transformer and liquid crystal display (LCD) device. Specifically, the present invention is directed to the direct packaging and electrical interconnection of the substrate, quartz crystal, LCD, power cell and step-up transformer (when required) within wrist watches of a variety of different shapes and sizes and through the use of component packaging modules, hereinafter referred to as "nests". These nests have exterior contours designed to fit closely within a watch shell of predetermined size and shape and have interior contour configurations designed to demountably secure the substrate, quartz crystal, LCD, power cell and step-up transformer in electrically interconnecting engagement. A different nest is used with each different watch shell whereas the aforesaid discrete electronic components remain the same for all watches, and are designed to be directly interchangeable with other components of the same kind.

A principal limitation of solid state timepiece assemblies heretofore devised was that they fit only one watch shell design. Such time piece assemblies were typically assembled with the aid of microscopes in laboratory "clean-room" environment and were then completely encapsulated or hermetically sealed within a container adapted to fit within a watch shell of only one predetermined size. Another limitation inherent in all such assemblies was that the testing, repair and replacement of any components of the watch was virtually impossible by any jeweler outside of the laboratory of the manufacturer of any given electronic watch assembly. Moreover, many of the prior art watch assemblies were made so that repair thereof was essentially impossible, necessitating the replacement of the entire assembly when a failure of any component occurred.

Another principal drawback of prior art solid state time piece assemblies was the relatively large size and transverse thickness of the total package required to contain all of the separate components. Also, the many discrete internal components of such prior art watch assemblies caused them to have an excessive weight compared with conventional mechanical wrist watches. Further, in prior art electronic watches the many discrete components and the interconnections thereof necessitated numerous and involved manufacturing operations which increased production costs well in excess of those for mechanical watches.

SUMMARY OF THE PRESENT INVENTION

One primary object of the present invention is to provide a method of packaging solid state electronic time-keeping wrist watch assemblies into a variety of different package configurations in a way that solves the aforesaid problems and limitations of the prior art.

Another important object of the present invention is to provide a module of standard electronic components in electrically interconnecting engagement which is adapted to be demountably secured within functional time-keeping assemblies having different layouts and physical configurations.

It is a further object of the present invention to provide nests of any number of different layouts with internal contours for interconnecting the standard electronic components of a solid-state time-keeping device into a functional watch assembly.

Another object of the present invention is to provide an electronic time-keeping assembly suitable for simplified mass production manufacturing processes and readily repairable by jewelers and watch makers in the field without need for a high level of skill and exotic electronic equipment, tools or measuring devices.

The aforesaid and other objects are accomplished with a small printed circuit substrate assembly which can support all of the electronic components of the time-keeping device thereon except for a liquid crystal display and a power cell. The size of this substrate in length, width and thickness is such that it can readily fit within standard size wrist watch cases of different configurations. This is made possible in part because of the technique of mounting a single LSI CMOS semiconductor device entirely within the substrate in accordance with the invention disclosed in assignee's co-pending United States patent application Ser. No. 469,460, filed May 13, 1974, entitled "Combined Semiconductor Device and Printed Circuit Board Assembly", the disclosure of that co-pending application being incorporated herein by reference.

The aforesaid substrate of time-keeping subassembly consists of a structural member having a top surface and a bottom surface on which a plurality of electrical display contactors are spaced to engage similarly spaced display contactors on the back side of a liquid crystal (LCD) device. In a time keeping assembly according to the present invention the LCD is placed into a central recess of the package nest so that the time display segments on the front of the LCD are viewable through a display window in the nest. The substrate is then placed into the nest so that the display contactors thereof are connected to the display contactors of the LCD through a frame carrying plural transverse elastomeric conductors which provides electrical interconnection of the substrate and the display unit. The display unit is held against the interior chamber surfaces of the nest by contactor engagement within the substrate. The LCD device may contact the substrate directly or a separate interconnect device between the substrate and the LCD may be used.

Connector pins are located on the top surface of the substrate whereby the quartz crystal, a step-up transformer (if required) and the power cell may be electrically connected to the substrate. Interconnection of the crystal unit, step-up transformer and power cell is preferably accomplished through wire conductors whose ends are attached by suitable quick disconnect means to connector pins on the top surface of the substrate.

The quartz crystal unit utilized to provide a time base fequency of 32,768 hertz is preferably contained in its own hermetically sealed vacuum can to reduce its series resistance, improve its activity for any given drive current, and minimize any natural aging effects on the crystal. In alternative embodiments the quartz crystal may be supported on the substrate or within the nest adjacent to the substrate.

The power cell and step-up transformer are wired to the substrate in the same manner as the crystal. Pins mounted in the nest and engaging the battery and transformer are connected to corresponding connection pins on the substrate through suitable conductors.

An appropriate switch device is provided on the watch for controlling the operation and setting of the electronic time-keeping circuit. One form of rotary switch is mounted in the back plate of the watch shell in a position so that contactors on the switch bottom engage certain terminal control pads on an inner surface of the substrate. When the switch is moved manually to different positions, its contactors engage different combinations of terminal pads on the substrate to put the circuit in the "run" or "hold" modes or for setting the hours or minutes on the watch display. Other forms of switches are also useable for watches utilizing the components assembly of the present invention.

When installed within a watch case according to the invention, a package or assembly comprising the LCD, substrate, quartz crystal, power cell and battery are held together in close physical proximity by a nest made of lightweight non-conducting material such as plastic. Each standard component fits closely within the nest so as to engage the other components in such a manner so as to provide the necessary electrical interconnections. The time-keeping components of the assembly are also retained within the nest by the front and back members of the watch shell which are held in a normal interlocking engagement. When in such engagement, the time setting control switch is in position for contacting the various control terminals on the substrate. The overall assembly is one that is unusually compact, easy to assemble and repair without the necessity of specialized skills or tools and yet one that is easily adaptable to a wide variety of watch case sizes and styles.

Other objects, advantages and features of the invention will become apparent from the following detailed description thereof presented in conjunction with the accompanying drawings.

DETAILED DESCRIPTION OF A PREFERRED EMBODIMENT

Figure 1:
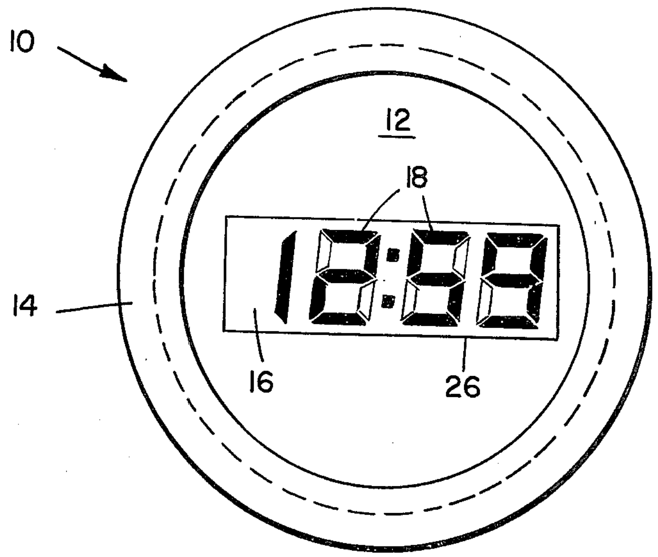
FIG. 1 is a front view in elevation of a typical wrist watch utilizing a time-keeping assembly in accordance with the present invention.

Referring to the drawings, a wrist watch constructed in accordance with the present invention and generally indicated by reference numeral 10 in FIG. 1 comprises a nest 12 which is sized to fit closely into a watch case 14, as shown by the dotted lines marking the outer circumference of the nest and the inner circumference of the watch case. The exposed portion of the nest 12 serves as the watch face and defines a display window 16 through which the digital segments 18 of a series of display characters may be observed indicating substrate time in hours and minutes.

Figure 2:
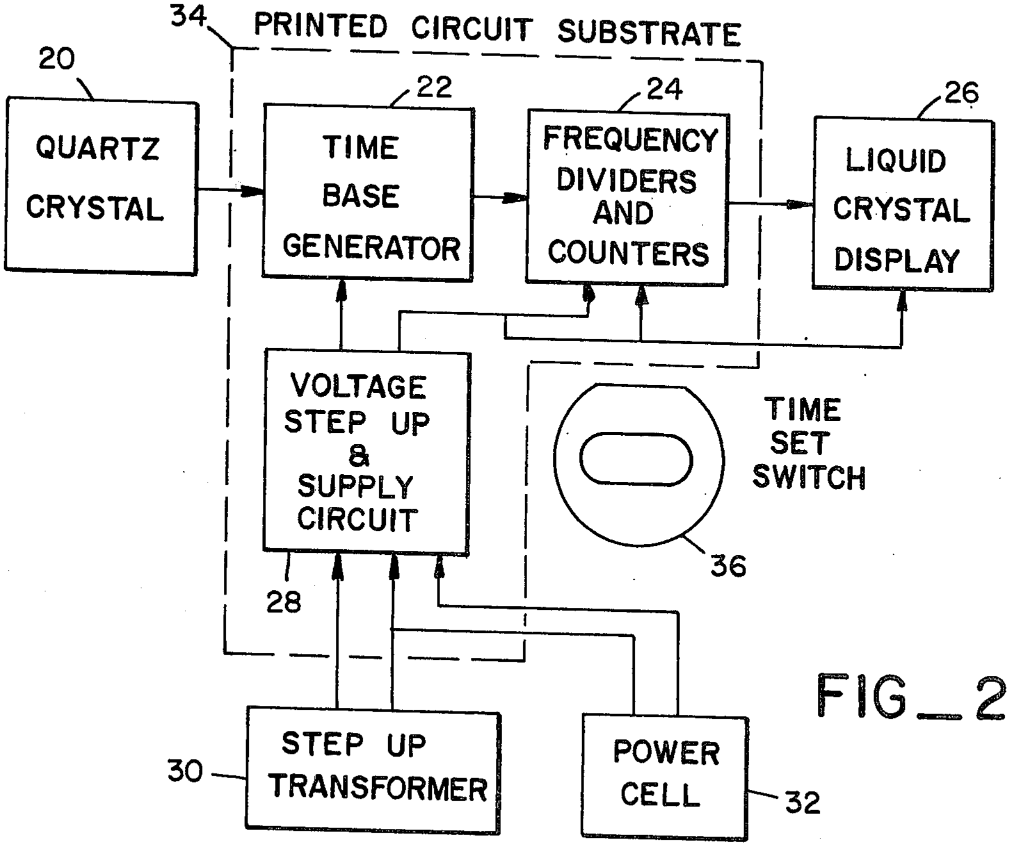
FIG. 2 is a simplified block diagram showing the circuit path of the electronic components comprising the time-keeping assembly of the present invention.

FIG. 2 is a simplified block diagram showing the electrical circuit paths of the standard electronic components within a package or time-keeping assembly constructed in accordance with the present invention. The circuit comprises a quartz crystal 20 controlling the frequency of a time base generator 22 which in turn provides a time base signal to a frequency divider and counter circuit 24. The counter circuit outputs are used to drive a four digit liquid crystal display unit 26. In this embodiment a voltage step-up and supply circuit 28 is used for providing a seven and a half volt potential to the time base generator 22, the frequency divider and counter circuit 24, and the liquid crystal display 26. A step-up transformer 30 and a one and a half volt power cell 32 are connected to the voltage step-up and supply circuit 28. As will be shown and described later different power cells with increased output capabilities as well as display devices with lower voltage requirements can also be used within the scope of the invention. Thus, some embodiments of the present invention will not require the step-up transformer.

An important component of the time-keeping assembly according to the invention is printed circuit substrate 34 which in this embodiment contains all circuit components for the time-keeping package except the quartz crystal 20, the liquid crystal display 26, the step-up transformer 30, the power cell 32. A time set switch 36 is also provided which electrically engages the circuitry of the substrate 34 so that the correct time may be entered into the counters within the substrate 34 and displayed by the liquid crystal display 26.

Figure 3:
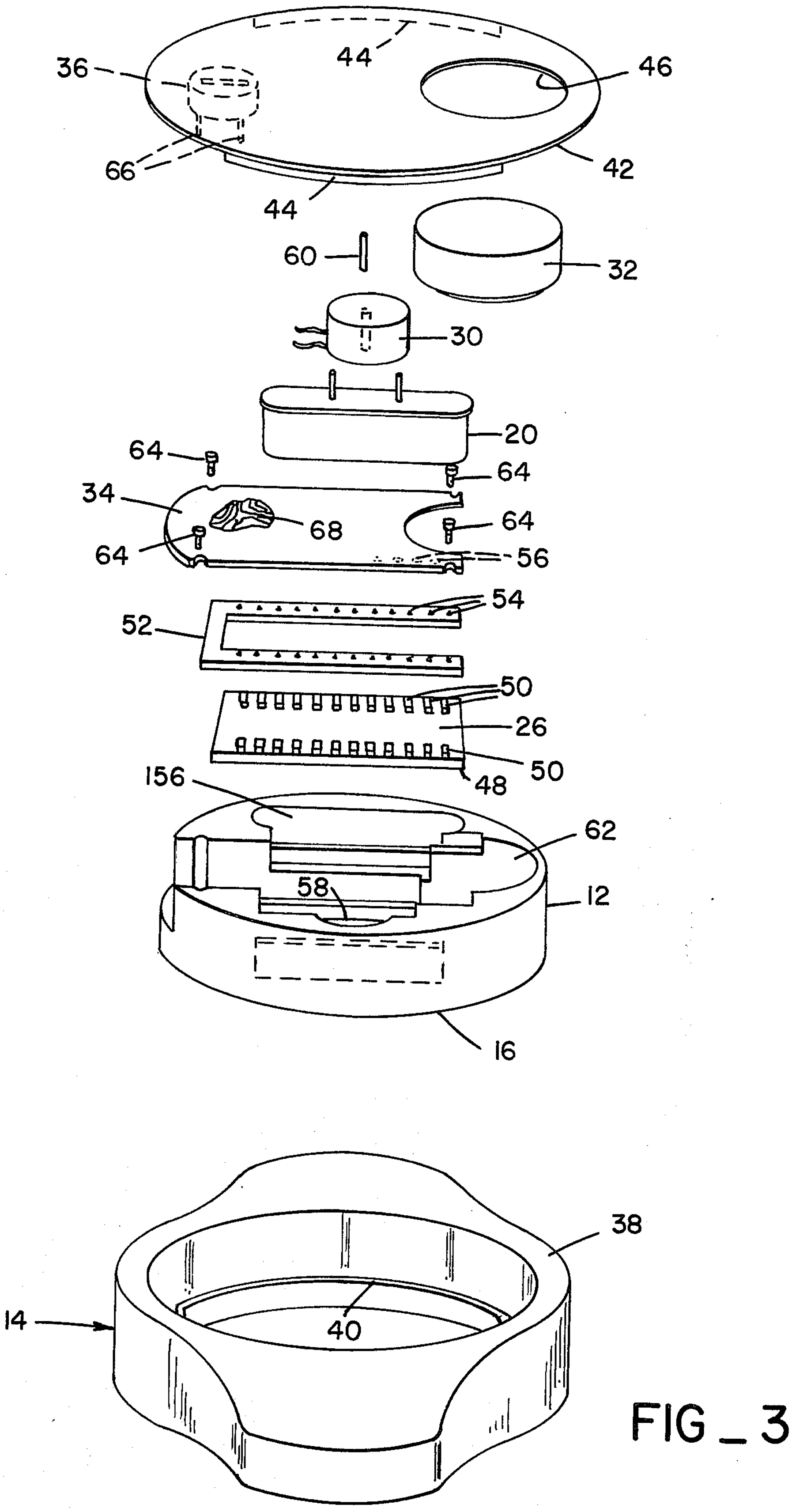
FIG. 3 is an exploded view in elevation and perspective of the wrist watch of FIG. 1.

FIG. 3 is an exploded view in front elevation and perspective of the wrist watch of FIG. 1. The watch case 407,147 comprises a frame 38 defining a cylindrical hole sized to receive the nest 12 entirely therewithin, and an inwardly extending flange 40 on the frame to retain the nest 12. A removable back plate 42 is provided with two lips 44 normal to and extending along the periphery thereof so that it may be removably secured to the watch frame 38. In the embodiment shown the backplate 42 contains time set switch 36 and a power cell access cover 46. The set switch shown is described in greater detail in assignee's co-pending U.S. patent application, Ser. No. 407,147 filed on Oct. 17, 1973 and entitled "Switch for Electronic Watch", now U.S. Pat. No. 3,884,033.

As shown in the embodiment of FIG. 3 all electronic components including the LCD 26, the substrate 34, the quartz crystal 20, the step-up transformer 30 and the power cell 32 fit closely within the nest 12. The LCD 26 is first placed into nest 12 with display segment surface 48 held against the interior surface of the nest 12 containing the display window 16 shown in FIG. 3 in hidden view. On the back surface of the LCD 26 are two rows of spaced metallic connection pads 50 adjacent to the lengthwise edges of the LCD 26. These pads 50 are electrically contacted by hemispherical contactors or terminals mounted on the bottom side of a U-shaped interconnector 52. Each such hemispherical contactor extends transversely through the interconnector 52 and forms a corresponding contactor 54 on the top side of the interconnector 52 for electrical contact with two rows of spaced metallic connection pads 56 (shown in hidden view in FIG. 3) corresponding to the pads 50 on LCD 26. This provides electrical interconnection of the LCD 26 with the substrate 34. The interconnector 52 is sandwiched between LCD 26 and substrate 34 within nest 12 and may be movably mounted therein. Crystal 20 fits into an elliptical chamber 156 of the nest 12 adjacent to the upper lengthwise edges of the LCD 26, interconnect 52 and substrate 34 combination within the nest 12. The step-up transformer 30 fits into a semicircular chamber 58 adjacent to the lower lengthwise edges of the LCD 26, interconnect 52 and substrate 34 combination within the nest 12 and is secured therein by pin 60 pressed into the nest 12. The power cell 32, such as commercially available AgO or $Ag_2O$ type batteries, fits into a circular chamber 62 within the nest 12 formed by a semicircular right edge of the substrate 34 and an opposite adjacent semicircular interior wall of nest 12. The size and output of power cells useable for time-keeping devices according to the invention can vary, and in some instances more than one power cell may be used. The LCD 26, interconnect 52 and the substrate 34 are secured to the nest 12 by four screws 64 threaded into the nest.

Figure 4:
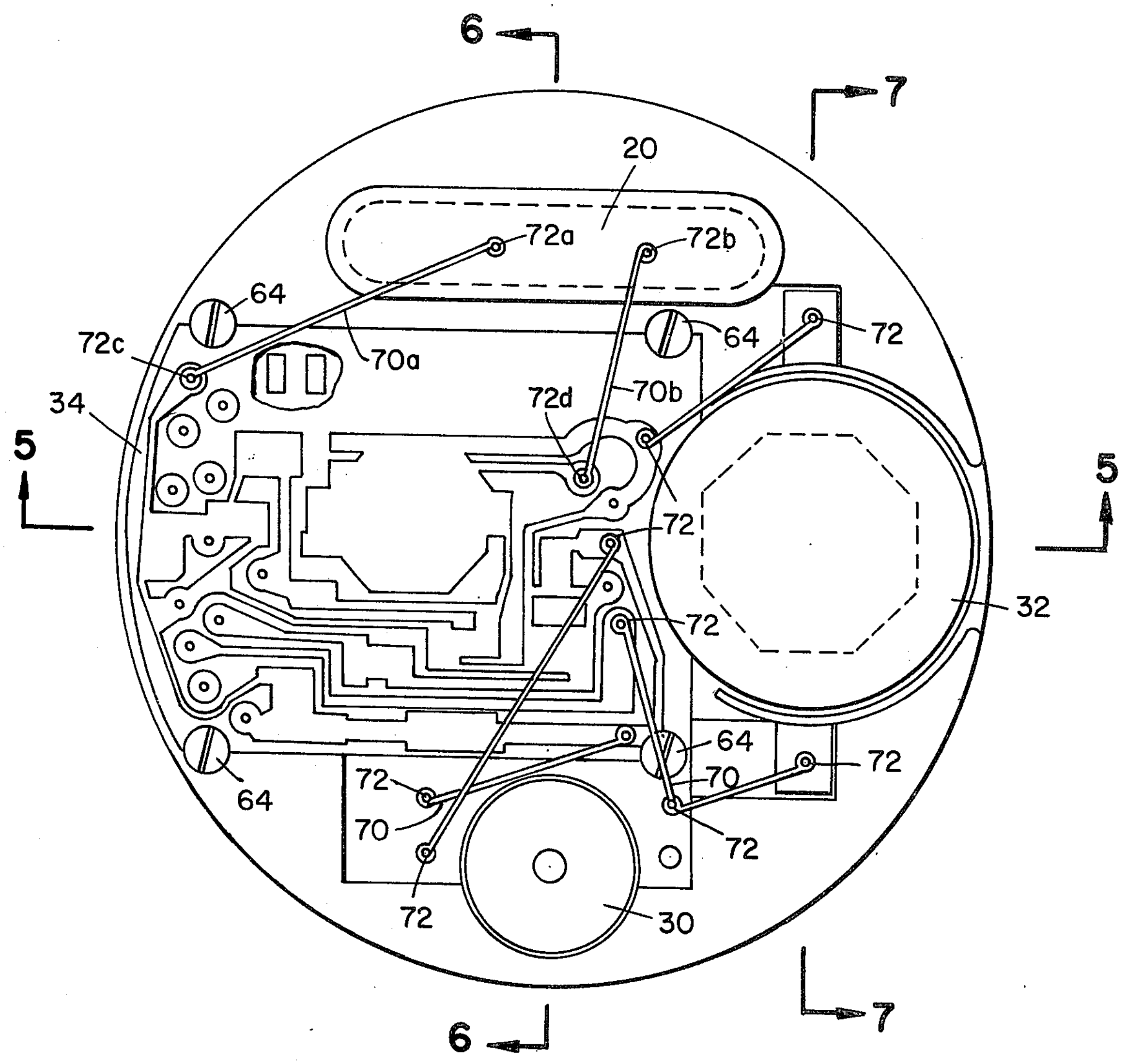
FIG. 4 is an enlarged plan view of the back of a solid state time-keeping package of the present invention adapted to fit within the wrist watch of FIG. 1.

FIG. 4 is a plan view of the interior of the assembled wrist watch 10 of FIG. 1 as it would appear with its back cover removed. The substrate 34, the quartz crystal 20, the step-up transformer 30 and the power cell 32 are shown installed within the nest 12. The LCD 26 is entirely hidden from view by the substrate 34, which is secured to the nest 12 by the four screws 64.

The substrate 34 is made as a separate component of the assembly in accordance with the materials and method steps described in the aforesaid U.S. patent application Ser. No. 469,460. The substrate is essentially a small printed circuit board within which is a CMOS integrated circuit device that incorporates the time-keeping circuitry including the time base generator 22 and the frequency dividers 24. The semiconductor device is supported on a small carrier secured within the board and the terminals or pads of the semiconductor device are connected, as by wire bonding, directly to the ends of conductor paths on the substrate board. The wire bonds and the semi-conductor device itself are surrounded by an encapsulation material. Other elements of the electronic circuitry are fixed to the substrate 34 which, as shown in FIG. 4, is preferably provided with a curved convex edge at one end and a curved concave edge at its opposite end. These convex and concave edges enable the substrate to fit with the nest 12 with a minimum waste of space and in a position to be readily connectable to other components.

FIG. 4 illustrates the manner of electrical interconnection between the four standard components visible within the nest 12. In this embodiment detachable spiral end wound connection wires 70 engage upright connection pins 72 to form the necessary electrical interconnection paths. The wires 70 are readily removed with the aid of small "needle-nose" pliers generally available to jewelers and watchmakers. Other quick disconnect means for connecting the ends of wires 70 to the pins 72 could be used, if desired.

Figure 5:
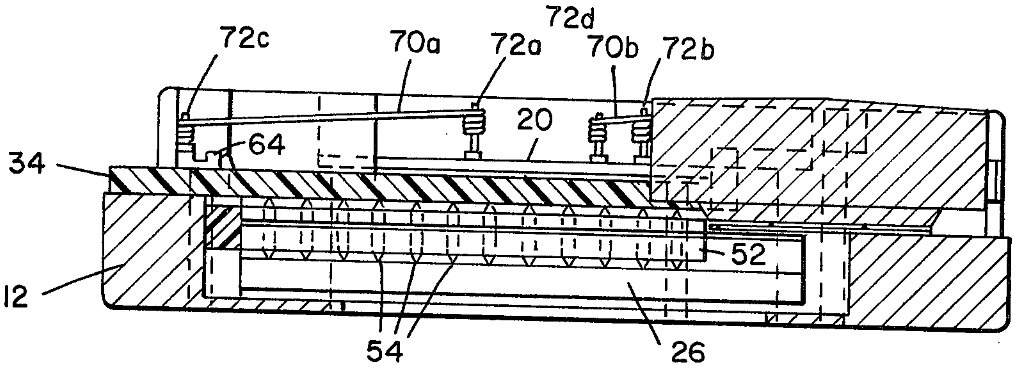
FIG. 5 is a view in elevation and in section taken along line 5—5 of FIG. 4.

As shown in FIG. 5, two connection wires *70a*, *70b* interconnect pins *72a* and *72b* on the crystal 20 and the corresponding pins *72c* and *72d* on the substrate 34. In addition, the transverse double hemispherical contactors 54 are shown passing through the interconnector 52, thereby electrically interconnecting the LCD 26 with substrate 34 as well as mechanically securing the LCD within the nest 12. One of the four screws 64 which lock substrate 34, interconnector 52 and LCD 26 in combination within the nest 12 is also shown in FIG. 5.

Figure 6:
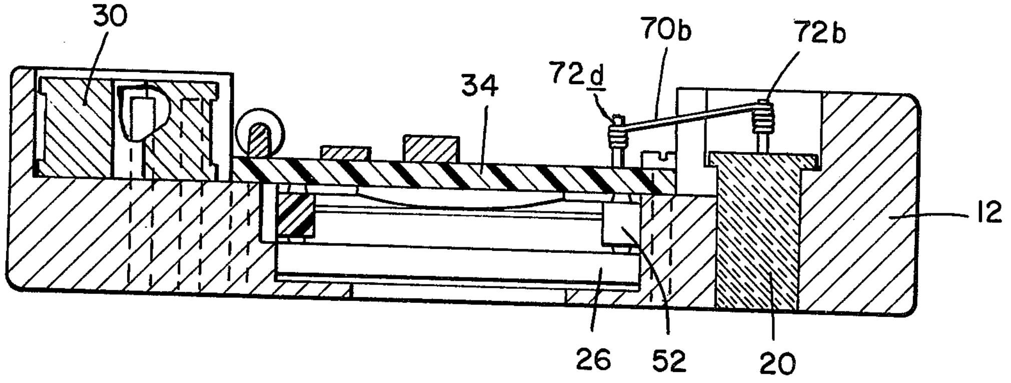
FIG. 6 is a view in elevation and in section taken along line 6—6 of FIG. 4.

In FIG. 6, another view in diametrical section, at right angles with the section view of FIG. 5, and and elevation of the package of FIG. 4 along line 6—6 is given. This view illustrates the positioning of the quartz crystal 20 and the step-up transformer 30 with respect to the LCD 26, interconnector 52 and substrate 34 combination within nest 12. The connector wire *70a* and connector pins *72a* and *72b* are also shown in FIG. 6.

Figure 7:
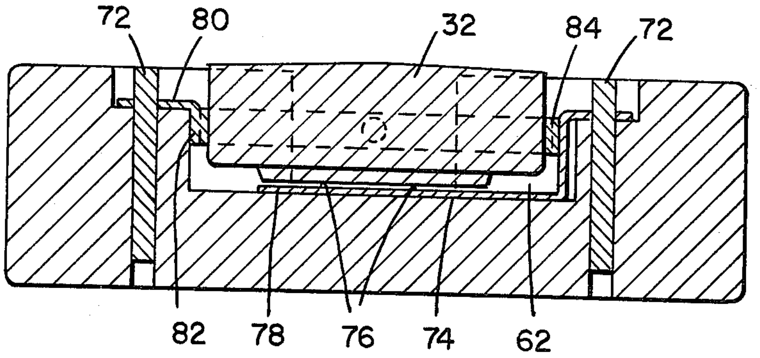
FIG. 7 is a view in elevation and in section taken along line 7—7 of FIG. 4.

FIG. 7 is provided for the purpose of illustrating plaacement of and electrical interconnection with the power cell 32 in this embodiment. A contact strap 74 made of conductive material such as beryllium copper follows the contour of the bottom surface of the power cell chamber 62 within the nest 12 and continuing up the right interior sidewall thereof to a point where it bends over to contact a connector pin 72. Three pointed deformations 76 within the contact strap 74 engage one terminal 78 of the power cell 32. The other connection to the power cell 32 to its case is made by a contact strap 80 containing pointed deformations 82 which contact the side of the cell 32.

Figure 8:
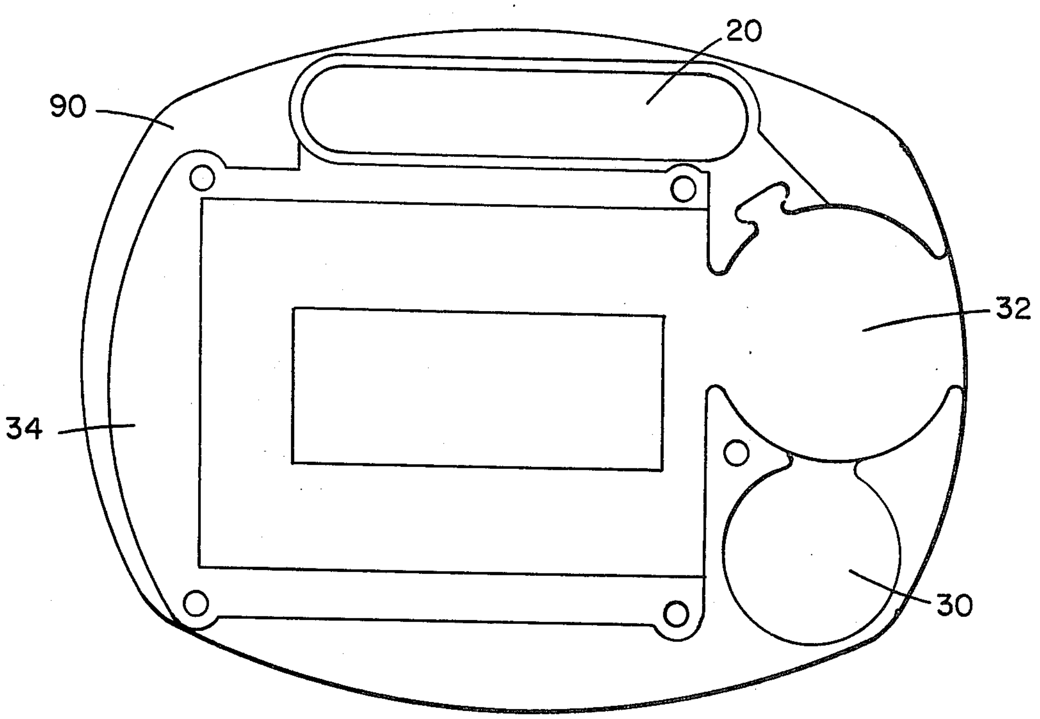
FIG. 8 is an enlarged plan view of the back of another solid state time-keeping package of the present invention showing a modified component assembly.
Figure 9:
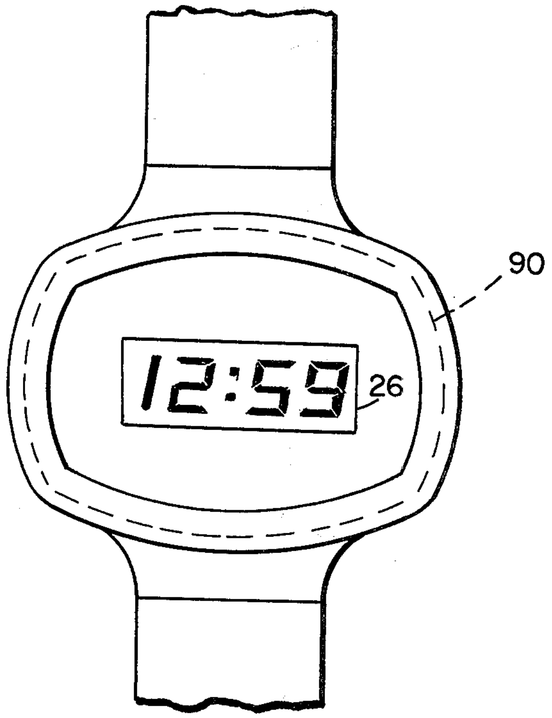
FIG. 9 is a front view in elevation of a wrist watch shaped to contain the package of FIG. 8.

In accordance with the method of the present invention wrist watches of differing physical sizes and shapes may be designed and constructed using the electronic components previously described herein in various physical layouts. For example, different layout of these components is illustrated in the plan view of FIG. 8. In this illustration nest 90 is designed for insertion within a wrist watch of a rounded rectangular contour as illustrated in FIG. 9. In FIG. 8, the substrate 34 overlies the interconnector 52 and the LCD 26 in the same manner as is illustrated in FIG. 6. However, in the nest 90 of FIG. 8 the step-up transformer 30 is placed adjacent to the power cell 32. The quartz crystal 20 remains in the same general position as is shown in FIG. 4.

Figure 10:
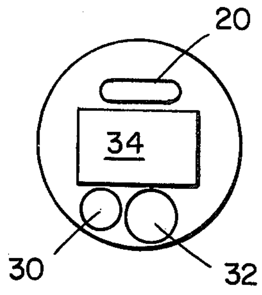
FIG. 10 is a simplified top plan view of another solid state time keeping package according to the invention.
Figure 11:
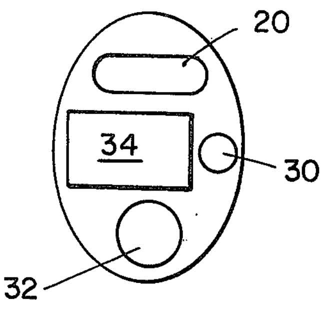
FIG. 11 is another simplified top plan view of an oval solid state time keeping package.
Figure 12:
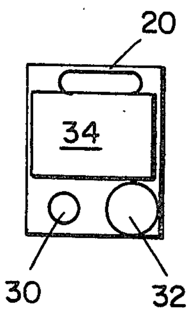
FIG. 12 is yet another simplified top plan view of a rectangular solid state time keeping package.

FIGS. 10, 11 and 12 are simplified plan views illustrative of other nest configurations made possible with the present invention.

In FIG. 10, the quartz crystal 20 is adjacent to the upper lengthwise edge of the substrate as in the nest 12 of FIG. 4; however, the power cell 32 has been positioned adjacent to the step-up transformer 30 along the lower lengthwise edge of the substrate 34. In the oval shaped nest of FIG. 11, the quartz crystal 20 is mounted in the same relation to the substrate 34 as shown in FIG. 4; however, the position of the step-up transformer 30 and the power cell 32 have been reversed over the respective position of FIG. 4. Finally, in a square nest shown in FIG. 12, the four components shown follow the general layout of the nest of FIG. 10.

Figure 13:
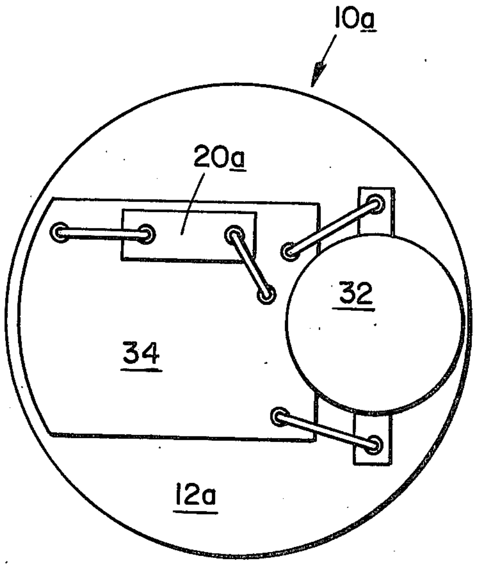
FIG. 13 is an enlarged top plan view showing the back of another solid state time keeping package with the quartz crystal mounted on the substrate.

In some instances it may be advantageous to provide a quartz crystal 20*a* of reduced size which as shown by the watch 10*a* in FIG. 13, may be mounted directly on the inner side of the substrate or board 34. In this embodiment of the present invention even less space is required for the entire watch assembly, and it is therefore adaptable for installation in even a wider range of watch cases of differing sizes and shapes. Also, with the use of a power cell of higher voltage output coupled with display devices requiring a lower drive voltage, the step-up transformer 30 can be eliminated. Consequently, all of the essential components of the watch, except the display and power cell, are supported by or attached to the substrate 34 which is connected to these other components when installed in a suitable nest 12*a*. As with the previous embodiments the nest retains the LCD 26 so that it electrically interconnects with the substrate 34. Although the connector 52 is particularly effective for providing this interconnection it may be accomplished using other connection means. For example, the substrate terminals points may be provided with built up hemispherical portions or projections which extend far enough to contact the pads on the LCD device.

From the foregoing, it is apparent that the present invention provides an electronic time-keeping assembly that is unique in its simplicity and adaptability for high volume, low cost production. Yet, the assembly can be of the highest quality and should provide a highly accurate time-piece capable of long, trouble-free service. Moreover, should failure of any component occur, its replacement can be quickly and easily accomplished by a relatively unskilled person, a feature heretofore unavailable in prior art time-keeping devices.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An electronic digital solid state watch assembly comprising:

a. a watch frame having a front time display side thereof with a display opening therein and defining an interior cavity, and a backplate removably mounted on a back side thereof and closing said cavity;

b. a nest member located entirely within and occupying said cavity and having a time display window visible through the display opening of said frame, said nest member including somewhat irregular interior portions contoured to form a plurality of recesses;

c. digital display means for providing a visual time display, said display means packaged in a unit having two flat and generally parallel surfaces with means forming digital time display segments that are viewable on a front surface, and electrical connection points on a back surface, said display means being sized to fit closely within a display unit recess of said nest, said nest having means in said display unit recess for holding said display unit in place so that said time display segments may be viewed through the display window of the nest; d. a crystal unit mounted within said nest;

e. power supply means retained within said nest;

f. a printed circuit substrate containing electronic circuitry powered by said power supply means for generating time signals from said crystal unit and for driving said digital display means and substrate having two flat generally parallel surfaces with a front surface containing contact means for providing an electrical interconnection with said display means, and a back surface having electrical conductor paths with interconnection means for said quartz crystal unit and for said power supply means, said substrate overlying said display unit recess within said nest and secured therein, and g. means between said display unit and said substrate for electrically interconnecting said display means to said substrate and for simultaneously mechanically locking said display unit in place in said nest when said substrate is secured within said nest.

2. The wrist watch assembly of claim 1 wherein said quartz crystal unit is mounted within said nest adjacent to said substrate.

3. The wrist watch assembly of claim 1 wherein said quartz crystal unit is mounted directly on said back surface of said substrate.

4. The wrist watch assembly of claim 1 including a transformer means connected to said power supply means and mounted on said substrate.

5. The wrist watch assembly of claim 1 including a transformer means connected to said power supply means and supported within said nest member adjacent to said substrate.

6. The wrist watch assembly of claim 1 wherein said substrate has a convex surface at one end and a concave surface at its other end which fits adjacent to said power supply means.

7. The watch assembly of claim 1 wherein said electrical connection points on the back surface of said display unit are arranged generally adjacent at least two opposite edges thereof; wherein said contact means on the front surface of said substrate are provided adjacently opposite to said connection points; and wherein said means between said display unit and said substratae comprises generally U-shaped connector means having spaced apart conductive contactors on opposite segments of said U-shaped connector means, said contactors being mounted and aligned for interconnecting said substrate and said display means and for locking said display unit when said connector means is held within said nest by said secured substrate.

8. The wrist watch assembly of claim 1 wherein said nest means has an outer configuration that is similar in shape but slightly smaller than said watch frame and fits therein.

9. The wrist watch assembly of claim 1 wherein said electronic circuitry of said substrate is a single integrated circuit CMOS device supported within said substrate and electrically connected to conductive paths and discrete elements on said substrate.

10. An electronic sub-assembly for use in combination with a power cell, means for fixing a standard frequency signal, a watch frame, and a digital display to provide a solid state watch, comprising:

a nest member retained within said frame, said member having a display recess with a display window for holding said digital display in a predetermined position therein, and a substrate recess for holding a printed circuit substrate in a predetermined registration with said display; and, a printed circuit substrate removably secured within said member, said substrate containing electronic circuitry for generating time signals from said standard frequency signal and for driving said digital display, said substrate having two flat generally parallel surfaces with a front surface containing contact means for electrical interconnection with said display means when said substrate is secured in said predetermined registration with said display, and a back surface having electrical conductor paths with interconnection means extending to said power, cell; and means extending between said substrate and said display for electrically interconnecting said contact means and said display and for locking said display in place when said substrate is secured within said nest.

11. The sub-assembly of claim 10 wherein said means for fixing a standard frequency signal comprises a quartz crystal unit mounted directly on said back surface of said substrate.

12. The sub-assembly of claim 10 wherein said electronic circuitry for generating time signals comprises an integrated circuit semiconductor device supported within said substrate and electrically connected to conductive paths and discrete elements on said substrate.

13. The sub-assembly of claim 12 including a step-up coil mounted in a recess in said nest and connected to said substrate.

14. The sub-assembly of claim 10 wherein said means between said substrate and said display for providing electrical interconnections with said display are spaced apart contactors arranged along opposite sides of said front surface.

15. The sub-assembly of claim 10 wherein said substrate has a convex end surface at one end and a concave end surface at its opposite end.

16. The wristwatch assembly of claim 1 wherein said means between said display unit and said substrate comprises a removable insulating member carrying a series of spaced apart conductuve elastomeric interconnectors, the spacing thereof providing the locking of said display means in place.

17. The sub-assembly of claim 10 wherein said means between said substrate and said display comprises a removable insulating member carrying a series of spaced apart conductive elastomeric interconnectors, the spacing thereof providing the locking of said display in place.

* * * * *